United States Patent [19]

Alexeff

[11] Patent Number: 4,818,185

[45] Date of Patent: Apr. 4, 1989

[54] ELECTROMAGNETIC APPARATUS OPERATING ON ELECTRICALLY CONDUCTIVE FLUIDS

[75] Inventor: Igor Alexeff, Oak Ridge, Tenn.

[73] Assignee: The University of Tennessee Research Corporation, Knoxville, Tenn.

[21] Appl. No.: 107,943

[22] Filed: Oct. 13, 1987

[51] Int. Cl.[4] .................................... H02K 44/00
[52] U.S. Cl. ................................. 417/50; 310/11
[58] Field of Search ......................... 417/50; 310/11

[56] References Cited

U.S. PATENT DOCUMENTS

| | | |
|---|---|---|
| 2,787,219 | 4/1957 | Werner . |
| 2,807,212 | 9/1957 | Lindenblad . |
| 2,978,985 | 4/1961 | Lindenblad . |
| 3,008,418 | 11/1961 | Blake . |
| 3,045,599 | 7/1962 | Carlson, Jr. et al. . |
| 3,115,837 | 12/1963 | Campana . |
| 3,411,447 | 11/1968 | Fox et al. . |
| 3,837,763 | 9/1974 | Ertaud et al. ........................ 417/50 |
| 4,143,997 | 3/1979 | Deshais ............................... 417/50 |
| 4,278,404 | 7/1981 | Avanzini ............................. 417/50 |
| 4,286,926 | 9/1981 | Deshais et al. ..................... 417/50 |
| 4,364,713 | 12/1982 | Carbonnel .......................... 417/50 |

Primary Examiner—Donald E. Stout
Attorney, Agent, or Firm—Luedeka, Hodges & Neely

[57] ABSTRACT

An electromagnetic pump and generator apparatus for electrically conductive fluids includes a conduit for containing the conductive fluid and apertures in the sides of the conduit. A fluid circuit is defined outside the conduit for containing a quantity of the conducting fluid and is configured so that the conducting fluid in the circuit is in fluid communication with the conducting fluid in the conduit. When used as a pump, a magnet produces a magnetic field across the conduit between the apertures and a device is employed to produce an electric current in the conducting fluid in the fluid circuit. Current in the conducting fluid in the fluid circuit flow across the conduit through the conducting fluid contained therein between the apertures. The current flowing across the conduit together with the magnetic field imparts a force on the conducting fluid in the conduit causing the fluid to be pumped. Conducting fluid in the fluid circuit is essentially static and functions primarily as a means for conducting current to and from the fluid in the conduit eliminating the need for solid electrodes.

19 Claims, 1 Drawing Sheet

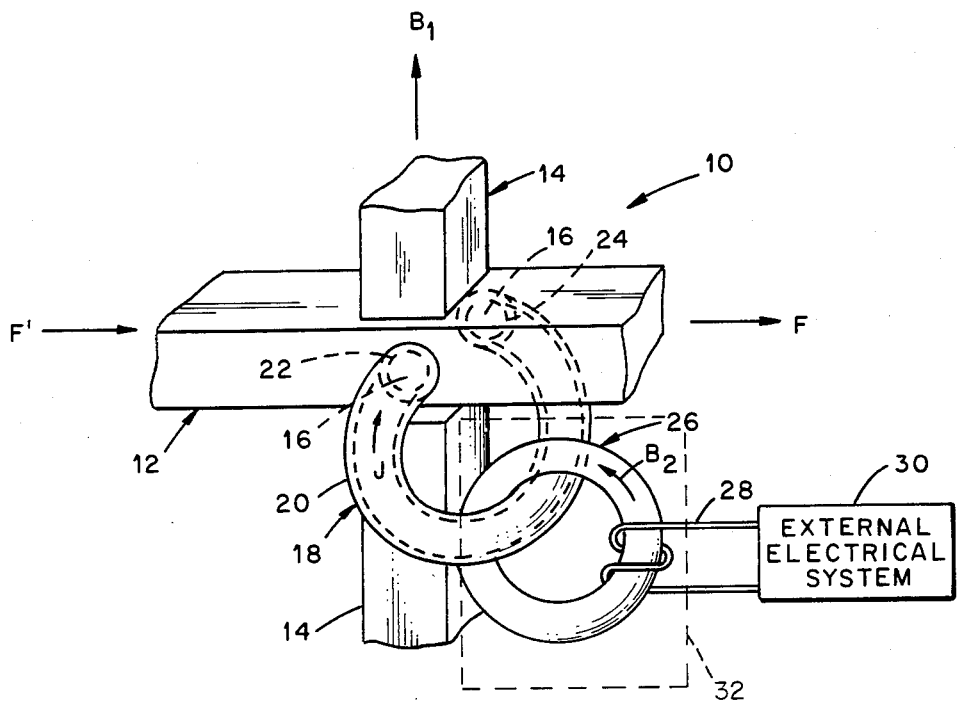

ELECTROMAGNETIC APPARATUS OPERATING ON ELECTRICALLY CONDUCTIVE FLUIDS

The present invention relates to electromagnetic apparatus for use with electrically conductive fluids and more particularly relates to an electromagnetic pump and generator wherein current conducted across a main fluid conveying conduit is generated in an external fluid circuit containing an essentially static quantity of the conductive fluid in fluid communication with the fluid in the conduit.

Conventional electromagnetic pumps and generators typically operate on electrically conductive fluid disposed to flow through a magnetic field. When used as a pump, a current is set up in the fluid and a force or thrust is imposed on the fluid in a direction perpendicular to the current. When used as a generator, the fluid is decelerated and a flow of current is produced in the fluid to power external elements. Since most such devices can operate both as pumps and generators, it is convenient to describe them chiefly in their capacity as pumps.

Known electromagnetic pumps typically employ an electromagnet disposed to generate a magnetic field across a fluid carrying duct or conduit. Electric current flow through the fluid is ordinarily achieved through the use of electrodes located on the inside of the conduit in contact with the fluid. This arrangement has been found unsuitable in a number of respects. For example, corrosion may occur on the electrode surfaces eventually resulting in significant interference with the flow of current. The high resistance drop at the fluid-electrode interface is not always present but, of course, the electrode must still be sealed into a non-conducting channel, which is an inconvenience with hot or corrosive fluids. Also, current-carrying solutions, such as salt water, exhibit outgassing which severely inhibits current flow, because the the electrodes get covered with a layer of insulating gas. In plasma devices—MHD generators and plasma thrustors—the problem is extremely serious in that the plasma deionizes—returns to a neutral gas state- when in contact with the electrodes. Thus, the conducting plasma is always separated from the metallic electrode by a layer of insulating gas and this causes a large voltage drop, power loss, arcing, and subsequent electrode destruction. The present invention eliminates the need for the electrodes and, thus, eliminates the aforementioned problems.

Another requirement of most MHD devices is a high current source. Operating any kind of MHD device, pumps or generator, depends on current density multiplied by magnetic forces. Since the magnetic field is limited, one requires high current density to get any effects at all. High current density implies a low-impedance, high-current supply. In the present invention such supply is conveniently provided by use of A.C. coupling directly inside the pump or generator. Such coupling is provided by a linked, toroidal core.

Thus, the invention makes two steps forward:
1. It eliminates electrodes with the problems of seals and possible voltage drops.
2. It eliminates the need for an external low-impedance supply. In the generator mode, it reduces the complexity and shrinks the size.

Electromagnetic pumps have been developed in an attempt to overcome problems of the type noted above. For example, U.S. Pat. No. 2,978,985 to Lindenblad discloses an electromagnetic pump that does not use electrode contacts but instead splits the main conveying conduit and induces a current flow into the conductive fluid itself in the split while it is flowing. The split is then brought together at a point where a magnetic field is imposed across the conduit. One significant problem with this design is creation of current loops where the splits are brought together which oppose the current flow induced in the split. This problem would tend to arise in any system where the current flow was induced in the moving conductive fluid itself, the result being significantly reduced pumping power.

A need therefore exists for an electromagnetic pump capable of pumping an electrically conductive fluid which overcomes problems of the type previously noted. In particular, a need exists for a pump of the character described which has no moving parts, eliminates the need for solid electrode plates, is capable of producing the required current flow without significant power losses, and which is capable of operating through a wide range of applications in a simple, efficient and relatively inexpensive manner.

The present invention meets the above needs and others through the provision of an apparatus for operating on electrically conductive fluid which comprises, in a preferred embodiment, a conduit for containing the conductive fluid with apertures formed in its sides. A fluid circuit is defined outside of the conduit for containing a qauntity of the conductive fluid, and is configured so that the conductive fluid contained in the fluid circuit is in fluid communication with the conducting fluid in the conduit through the apertures. Provision is made for producing a magnetic field across the conduit and between the apertures, and means are provided for producing an electric current flow in the conducting fluid contained in the fluid circuit. The current flow produced in the fluid circuit flows through the conducting fluid in the conduit between the apertures which, together with the magnetic field, cuses the conducting fluid in the conduit to be pumped. The fluid circuit is preferably configured so that the conducting fluid remains essentially motionless as electric current flows therethrough relative to the conducting fluid moving in the conduit. This virtually eliminates creation of current loops in the conduit which would oppose the desired current flow across the conduit between the apertures. Also, since the conducting fluid in the fluid circuit and conduit are the same fluid, there is no resistance or impedance to current flow between the two.

As used herein, the term electrically conductive fluid is used very broadly. It would include metal fluids, salt water, ionized gases, plasma, etc. It would also include dielectric fluids, such an oil, that will dielectrically conduct an alternating current.

According to another aspect of the invention, the magnetic field is an alternating field and the current produced in the fluid contained in the fluid circuit is an alternating current that is substantially in phase with the magnetic field.

According to a further aspect of the invention, alternating current is produced in the fluid contained in the fluid circuit using a magnetic field means disposed adjacent the fluid circuit for producing an alternating magnetic field. The magnetic field means includes a magnetic core surrounding the fluid circuit so that the magnetic field induces an alternating flow of current in the fluid contained in the fluid circuit of sufficient magnitude to effect the desired pumping. One advantage of this arrangement is that the permeability of the fluid in the fluid circuit is increased by the ratio of the permeability of the core to the fluid permeability. This enables significant reductions in the size of the conduit. Preferably, the magnetic field means includes a permeable iron core and is continuous, the magnetic field therein being developed by current-carrying windings disposed around the member.

According to still another aspect of the invention, an apparatus is disclosed for generating an electrical current using a flow of electrically conducting fluid being conveyed in a conduit. Apertures are provided in the sides of the conduit and a fluid circuit is defined outside of the conduit for containing a quantity of the conducting fluid. The fluid circuit is configured so that the conducting fluid contained therein is in fluid communication with the conducting fluid in the conduit through the apertures. Provision is made for producing a magnetic field across the conduit and between the apertures. Preferably, the apertures are located on opposite sides of the conduit and the magnetic field is in a direction that is substantially perpendicular to a line extending across the conduit from one of the apertures to the other. In one embodiment, the flow of fluid in the conduit is pulsed and the magnetic field is produced using a direct current so that a flow of alternating current is set up in the fluid contained in the fluid circuit. In another embodiment, the magnetic field is produced using an alternating current and the fluid flow is constant, also setting up a flow of alternating current in the fluid contained in the fluid circuit. An output device is disposed adjacent the fluid circuit to produce current flow useful for powering external devices.

The above and other aspects and advantages of the invention will become apparent to those of ordinary skill in the art as the same becomes better understood upon consideration of the following detailed description when considered in conjunction with the accompanying drawing which is a diagrammatic view illustrating a preferred form of the present invention.

Referring now to the Drawing, there is shown diagramatically a pumping and generating apparatus 10 according to a preferred embodiment of the present invention for use with electrically conductive fluid. As previously mentioned, the term electrically conductive fluid is used broadly and would include dielectric fluids. Generally, the apparatus 10 includes a conduit 12 configured to contain the fluid and conduct the same through the apparatus 10. Disposed adjacent the conduit 12 is a magnet 14 configured to create an alternating magnetic field of flux $B_1$ across the conduit 12. In the region of the flux $B_1$ are provided apertures 16 in the conduit 12, preferably on opposite sides thereof. A fluid circuit 18 is defined outside of the conduit 12 and is configured to contain a qauntity of the conducting fluid so that the fluid therein is in fluid communication with the fluid in the conduit 12. As will be described, a flow of current J is set up in the fluid contained in the fluid circuit 18 and flows across the conduit 12 between the apertures 16. The magnet 14 is positioned relative to the apertures 16 so that the current J flows through the flux $B_1$ and interaction of the current J and flux $B_1$ imposes a force F on the fluid in the conduit 12 in a direction perpendicular to the flux $B_1$ and current J, causing the fluid to be pumped.

When used as a generator, it is the object to produce the current J which is accomplished by flowing the conducting fluid through the conduit 12 under the influence of a force F' which moves the fluid through the flux $B_1$. This is essentially a reversal of the previously described process of pumping. The current J that is generated is utilized as will be described to provide power for external elements. Of course, in generating the current J there will be a power consumption of the force F' which is reflected in a lower pressure downstream of the apertures 16.

The fluid circuit 18 is represented by a circular tube 20 within which the conducting fluid is contained. The tube 20 is provided with openings 22 and 24 at its opposite ends which ends are preferably sealably connected to the conduit 12 at the apertures 16 so that the tube 20 opens into the conduit 12 on both of its ends. The tube 20 and conduit 12 may be lined with an insulating material such as glass or a suitable ceramic so that the apparatus 10 can be used with corrosive fluids.

As previously indicated, apertures 16 are preferably located on opposite sides of the conduit 12. Most preferably, apertures 16 are disposed in substantially diametrically opposed relation on the conduit 12 and are at substantially the same axial location along the longitudinal axis of the conduit 12. Thus, there is substantially no means by which fluid moving through the conduit 12 can induce movement of the fluid in the tube 20 since no net force can be imposed on the fluid contained therein. Accordingly, creation of current loops adjacent the apertures 16 that would interfere with the function of the apparatus 10 are virtually eliminated since the fluid in the circuit 18 is essentially static at all times.

A preferred means for producing a current flow in the fluid contained in the tube 20 includes a toroidal electromagnet 26 disposed to surround a portion of the tube 20 in a linking manner as shown. The electromagnet 26 preferably is a laminated iron core construction and is magnetized using windings 28 connected to a suitable source of alternating current, thereby to create an alternating magnetic field of flux $B_2$ in the electromagnet 26. The flux $B_2$ induces an electric field which in turn induces the current flow J in fluid circuit 18. Electromagnet 26 is preferably structurally isolated from the magnet 14 to minimize interference between the fluxes $B_1$ and $B_2$.

In operation as a pump, the conducting fluid, which may be liquid mercury, is allowed to fill the conduit 12 and circuit 18, preferably in a manner which eliminates any unoccupied pockets of space within the apparatus 10. Then, the magnet 14 is configured to impose the flux $B_1$ across the conduit 12 and preferably in a direction that is substantially perpendicular to a line passing from the approximate center of aperture 22 to the approximate center of aperture 24. Further, the magnet 14 is preferably positioned so that the line passing between the apertures 22 and 24 is in the strongest part of the flux $B_1$; and so that the flux $B_1$ is directed substantially perpendicularly to the center line of the conduit 12 at a point midway between the apertures 22 and 24.

With the flux $B_1$ imposed across the conduit 12, windings 28 are energized to initiate current flow J in fluid circuit 18 which current J follows the path of least impedance and thus flows substantially only across conduit 12 through the fluid between apertures 22 and 24. Force F is produced on the fluid perpendicular to flux $B_1$ and current flow J across the conduit, producing a flow of the fluid substantially in the direction of the force F. Maximum force F is thought to be achieved by virtue of the magnetic flux $B_1$ orientation in relation to the current J direction and the direction of the conduit 12.

Preferably, windings 28 are supplied with alternating current substantially ninety degrees out of phase with flux $B_1$ which is also alternating so that current J flowing across conduit 12 is substantially in phase with fux $B_1$.

In operation as a generator, the apparatus 10 is configured substantially as described for pumping. That is, the conducting fluid such as liquid mercury is contained in the conduit 12 and fluid circuit 18 and the magnet 14 is positioned as described to produce a magnetic field across the conduit 12. However, the fluid is pumped or forced through the conduit 12 toward the magnet 14 under the influence of force F' which produces current J in fluid circuit 18. In one form of the invention, magnet 14 is configured so that magnetic field $B_2$ is constant and the fluid is pulsed to produce an alternating current J. In another form of the invention that produces an alternating current, magnet 14 is configured so that magnetic field $B_1$ fluxes and the fluid is introduced at a constant rate. The current J produces flux $B_2$ in electromagnet 20 which in turn induces a flow of alternating current in windings 28. Current in windings 28 can then be utilized in operating external devices as desired, and they are connected to an external electrical system 30. Together, fluid circuit 18, electromagnet 26, and windings 28 constitute a transformer as indicated at 32.

Although a particular embodiment of the present invention has been illustrated and described, it will be understood by those of ordinary skill in the art that the invention is capable of numerous rearrangements, substitutions and modifications without departing from the scope of the claims below.

What is claimed:

1. An apparatus for operating on an electrically conductive fluid, comprising:
   a first conduit for containing the conductive fluid for movement therein;
   at least two apertures disposed across from each other in the sides of said first conduit;
   magnetic field means for producing a magnetic field across said first conduit between said apertures, and substantially perpendicular to a line passing across said first conduit between said apertures; and
   a second conduit for containing the conductive fluid therein, said second conduit being closed along its length and disposed outside of said first conduit and having first and second open ends which are connected to said apertures so that the conductive fluid in said second conduit is in fluid communication only with the conductive fluid in said first conduit and through said apertures so that a continuous fluid loop containing the conductive fluid is established extending through said second conduit and across said first conduit between said apertures thereby creating a path for the conduction of an electric current through said loop across said first conduit between said apertures, and said second conduit being further situated outside of said magnetic field to minimize the effect of the magnetic field on the conductive fluid carrying the electric current in said second conduit.

2. The apparatus of claim 1 further comprising:
   an external electrical system; and
   means for electrically associating the current carried in the conductive fluid in said second conduit with the external electrical system so that the external electrical system is affected by acceleration or deceleration of the conductive fluid in the first conduit.

3. The apparatus of claim 2 wherein said means for electrically interconnecting comprises an inductive power interconnection.

4. The apparatus of claim 2 wherein said means for electrically associating comprises a transformer wherein the conductive fluid in said second conduit is inductively linked to the transformer.

5. An apparatus for pumping electrically conductive fluid, comprising:
   a conduit for containing the conductive fluid for movement of the fluid therein;
   at least two apertures disposed across from each other in the sies of said conduit;
   magnetic field means for producing a magnetic field across said conduit and between said apertures and substantially perpendicular to a line extending across the conduit between said apertures;
   means defining a fluid circuit outside of said conduit for containing a quantity of the conductive fluid and being configured so that the conductive fluid contained in said fluid circuit is in fluid communication with the conductive fluid in said conduit through said apertures, said fluid circuit also being situated substantially outside of said magnetic field; and
   current producing means for producing a flow of electric current in the conductive fluid contained in said fluid circuit, said electric current flowing through the conductive fluid in said conduit and flowing across said conduit between said apertures, whereby said current flowing through the conductive fluid across said conduit interacts with said magnetic field to pump the conductive fluid in the conduit.

6. The pump of claim 5, wherein said magnetic field means produces an alternating magnetic field across the conduit and between said apertures, and said current producing means produces an alternating electrical current flow in the conductive fluid in said fluid circuit which alternating electrical current is substantially in phase with said alternating magnetic field.

7. The pump of claim 5, wherein said apertures are disposed along a line that is substantially perpendicular to the flow of conductive fluid in the conduit, whereby the conductive fluid in said fluid circuit remains substantially static as electric current flows there through relative to the conductive fluid moving in the conduit.

8. The pump of claim 5, wherein said means defining a fluid circuit loop comprises a substantially circular continuously hollow split ring including an inner layer of substantially non-electrically conductive material and having opposite open ends at the split, said open ends being sealably connected to said conduit at said apertures so that said ring opens into the conduit at said open ends through said apertures and the conductive fluid in said ring is in fluid communication with the conductive fluid in the conduit at both of said open ends.

9. The pump of claim 5, wherein said apertures are disposed in substantially diametric relation in said conduit and are at substantially the same axial location along the longitudinal axis of said conduit, whereby the fluid in said circuit remains substantially motionless in relation to the fluid being pumped in said conduit.

10. The pump of claim 5 wherein said current producing means comprises:
   second magnetic field means positioned adjacent said fluid circuit for producing a second magnetic field to induce a flow of electrical current in the conductive fluid in said fluid circuit.

11. The pump of claim 10, wherein said second magnetic field means comprises a torioidal member including a laminated iron core, said toroidal member being configured and disposed to encircle at least a portion of said fluid circuit.

12. The pump of claim 5, wherein said apertures are disposed directly across from each other in the conduit on opposite sides thereof so that electrical current flowing through the conductive fluid in the conduit between said apertures flows across said conduit in a direction substantially perpendicular to the direction in which fluid is to be pumped in the conduit, and said magnetic field means produces said magnetic field in a direction substantially perpendicular to the direction of said electric current flowing across said conduit.

13. The pump of claim 5, wherein said magnetic field means is isolated from said current producing means to prevent either from significantly interfering with the function of the other.

14. An apparatus for generating a current flow using electrically conductive fluid, comprising:
   a conduit for conducting a flow of the conductive fluid along a flow path;
   at least two apertures located across from each other in the sides of said conduit;
   magnetic field means for producing a magnetic field across said conduit between said apertures;
   means defining a fluid circuit outside of said conduit for containing a quantity of the conductive fluid and being configured so that the conductive fluid contained in said fluid circuit is in fluid communication with the conductive fluid in said conduit through said apertures, said fluid circuit also being situated substantially outside of said magnetic field;
   means for establishing a flow of the conductive fluid in said conduit along said flow path so that a current is produced in the conductive fluid flowing in said conduit through said magnetic field by the interaction between the moving conductive fluid and the magnetic field, said current flowing across the conduit between said apertures and through the fluid contained in said fluid circuit; and
   output means responsive to the current flowing in said fluid circuit to produce a current for being directed to devices external of the apparatus.

15. The apparatus of claim 14, wherein said means for establishing a flow is operable to pulsatively move the fluid in said conduit so that an alternating current is produced in said fluid circuit.

16. The apparatus of claim 14, wherein said apertures are disposed along a line that is substantially perpendicular to the flow of conductive fluid in the conduit, whereby the conductive fluid in said fluid circuit remains substantially static as electric current flows therethrough relative to the conductive fluid moving in the conduit.

17. The apparatus of claim 14, wherein said means defining a fluid circuit comprises a continuously hollow split loop including an innerlayer of substantial non-electrically conductive material and having opposite open ends, said open ends sealably connected to said conduit at said aperture so that said loop opens into the conduit at said open ends through said apertures and the conductive fluid in said loop is in fluid communication with the conductive fluid in the conduit at both of said open ends.

18. The apparatus of claim 14, wherein said apertures are disposed in an opposing relationship on directly opposite sides of the conduit and are at substantially the same axial location along the longitudinal axis of said conduit, whereby the fluid in said circuit remains substantially motionless in relation to the fluid in said conduit.

19. The apparatus of claim 14, wherein said means comprises:
   second magnetic field means positioned adjacent said fluid circuit for producing a second magnetic field; and
   said second magnetic field means being configured and disposed adjacent said fluid circuit so that said second magnetic field means is inductively coupled to the electrical current flowing in said fluid circuit.

* * * * *

UNITED STATES PATENT AND TRADEMARK OFFICE
CERTIFICATE OF CORRECTION

PATENT NO. : 4,818,185

DATED : April 4, 1989

INVENTOR(S) : Igor Alexeff

It is certified that error appears in the above-identified patent and that said Letters Patent is hereby corrected as shown below:   Title page:

In the Abstract, line 13, "flow" should be -- flows --.

Column 2, line 29, "qauntity" should be -- quantity --.

Column 2, line 39, "cases" should be -- causes --.

Column 8, line 35, after "said" insert -- output --.

Column 5, line 6, "fux" should be -- flux --.

Column 5, line 23, "20" should be -- 26 --.

Column 6, line 17, "sies" should be -- sides --.

Column 3, line 51, "of" should be -- or --.

Column 3, line 55, "qauntity" should be -- quantity --.

Column 4, line 39, "of" should be -- or --.

Signed and Sealed this

Thirty-first Day of October, 1989

*Attest:*

DONALD J. QUIGG

*Attesting Officer*   *Commissioner of Patents and Trademarks*